(12) United States Patent
Hasegawa et al.

(10) Patent No.: US 11,176,964 B1
(45) Date of Patent: Nov. 16, 2021

(54) OPTIMIZED TAPE UNMOUNT OPERATION

(71) Applicant: INTERNATIONAL BUSINESS MACHINES CORPORATION, Armonk, NY (US)

(72) Inventors: Tohru Hasegawa, Tokyo (JP); Tsuyoshi Miyamura, Yokohama (JP); Atsushi Abe, Ebina (JP); Shinsuke Mitsuma, Machida (JP); Hiroshi Itagaki, Yokohama (JP); Noriko Yamamoto, Tokyo (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/083,355

(22) Filed: Oct. 29, 2020

(51) Int. Cl.
| | |
|---|---|
| *G11B 15/43* | (2006.01) |
| *G11B 5/008* | (2006.01) |
| *G11B 20/12* | (2006.01) |
| *G11B 15/32* | (2006.01) |
| *G11B 15/093* | (2006.01) |
| *G11B 15/67* | (2006.01) |
| *G11B 20/10* | (2006.01) |

(Continued)

(52) U.S. Cl.
CPC .......... *G11B 15/43* (2013.01); *G11B 5/00813* (2013.01); *G11B 15/093* (2013.01); *G11B 15/32* (2013.01); *G11B 15/672* (2013.01); *G11B 20/1201* (2013.01); *G11B 5/584* (2013.01); *G11B 5/588* (2013.01); *G11B 2020/10898* (2013.01)

(58) Field of Classification Search
None
See application file for complete search history.

(56) References Cited

U.S. PATENT DOCUMENTS

| | | | |
|---|---|---|---|
| 8,373,941 B2 * | 2/2013 | Bayang ................. | G11B 27/36 360/71 |
| 9,063,666 B2 | 6/2015 | Amir | |

(Continued)

FOREIGN PATENT DOCUMENTS

JP    2016099728 A    5/2016

OTHER PUBLICATIONS

Hasegawa et al., "Optimized Tape Unmount Operation", U.S. Appl. No. 17/083,352, filed Oct. 29, 2020.

(Continued)

*Primary Examiner* — Tan X Dinh
(74) *Attorney, Agent, or Firm* — Haley J. McClory (57) ABSTRACT

A method for indexing a tape for unmounting from a tape drive is discussed. The method can determine that an update has been made to the tape since it was last mounted. The method can identify a tape head position with respect to the tape, the tape including a data partition and an index partition. The method can identify first position and a second position on the tape. The method can determine first distance, a length of tape between first position and tape head position. The method can determine second distance, a length of tape between first position and second position. The method can determine that first distance is less than second distance. The method can reposition the tape to a primary section and write the metadata index. The method can reposition tape to the second position write a data index beginning at the second position of the data partition.

20 Claims, 6 Drawing Sheets

(51) Int. Cl.
*G11B 5/584* (2006.01)
*G11B 5/588* (2006.01)

(56) References Cited

U.S. PATENT DOCUMENTS

| | | | |
|---|---|---|---|
| 9,235,347 B2 | 1/2016 | Klein | |
| 9,348,837 B2 | 5/2016 | Iwanaga | |
| 9,997,193 B1 * | 6/2018 | Hasegawa | G11B 27/107 |
| 10,078,466 B2 | 9/2018 | Hasegawa | |
| 10,423,336 B2 | 9/2019 | Abe | |
| 10,453,485 B1 * | 10/2019 | Miyamura | G11B 27/107 |
| 10,572,170 B2 * | 2/2020 | Abe | G11B 20/1201 |
| 10,580,438 B1 * | 3/2020 | Biskeborn | G11B 5/10 |
| 10,679,658 B1 * | 6/2020 | Winarski | G11B 15/00 |
| 10,726,868 B2 * | 7/2020 | Biskeborn | G11B 5/3153 |
| 10,802,724 B2 * | 10/2020 | Hasegawa | G11B 15/689 |
| 10,818,314 B1 * | 10/2020 | Miyamura | G11B 20/1886 |
| 10,964,350 B2 * | 3/2021 | Iben | G11B 5/3909 |
| 11,010,104 B2 * | 5/2021 | Hasegawa | G06F 3/0659 |
| 2019/0187913 A1 | 6/2019 | Hasegawa | |
| 2021/0056996 A1 * | 2/2021 | Bradshaw | G11B 5/70621 |

OTHER PUBLICATIONS

List of IBM Patents or Patent Applications Treated as Related. Filed Oct. 29, 2020, 2 pp.

IBM, "Sync operation", IBM Spectrum Archive Library Edition (LE) 2.4.1, downloaded from the internet on Feb. 5, 2020, 4 pages, <https://www.ibm.com/support/knowledgecenter/en/STZMZN_2.4.1/ltfs_sync_operation_linux.html>.

Mell et al., "The NIST Definition of Cloud Computing", Recommendations of the National Institute of Standards and Technology, NIST Special Publication 800-145, Sep. 2011, 7 pages.

\* cited by examiner

OPTIMIZED TAPE UNMOUNT OPERATION

BACKGROUND

The present invention relates to the field of tape data storage systems, and more particularly, to tape data storage systems having data partitions.

In tape data storage, magnetic transducers read data from and write data onto magnetic tape. Data is written on the magnetic tape by moving the magnetic tape over a magnetic transducer, also known as a tape head, to a position over the media where the data is to be stored. The magnetic transducer generates a magnetic field, which encodes the data onto the magnetic tape. Data is read from the magnetic tape by similarly positioning the magnetic transducer and sensing the magnetic field of the magnetic tape. Read and write operations may be independently synchronized with the movement of the magnetic tape to ensure that the data can be read from and written to particular locations on the tape.

Tape data storage systems have experienced significant technological advances since their conception. Current tape data systems offer a cost-effective method of storing large volumes of data for long periods of time. As such, industries that create large amounts of data each day (e.g., media and entertainment, banking, and science sectors) often use tape as a storage option. As the volume of data increases exponentially, efforts have been made to increase tape usability (e.g., reducing data access times). Many of these efforts culminated in the development of Linear Tape Open (LTO) technology. While development and advances to LTO technology continue, LTO technology may generally be referred to as an open-format tape storage technology having a single reel of tape stored in a removable cartridge. LTO tape technology is configured to enable high data integrity, scalability, and interchangeability. LTO technology also provides additional optional formatting for users including, but not limited to, compression, Write Once Read Many (WORM), encryption, and Linear Tape Filing System (LTFS).

With the advent of LTFS, users can choose to partition LTO tapes into a Data Partition (DP) and an Index Partition (IP). With a LTFS, data is generally only written in a DP and metadata (i.e., data describing the data/files stored in the data partition) is written in an index partition. Accordingly, organizing or partitioning the tape in such a way enables the tape to be self-describing through the use of a file index in the index partition. This results in reducing the complexity of data management and data access time for tape storage. LTFS and similar systems, have made it possible to use magnetic tape data storage devices in a similar manner to other removable storage systems (e.g., USB flash drives or external hard disk drives).

SUMMARY

According to one embodiment of the present invention, a computer-implemented method for unmounting a tape from a tape drive is disclosed. The computer-implemented method includes receiving a request to unmount the tape from the tape drive. The computer-implemented method further includes determining that at least one update has been made to the tape since the tape has been mounted to the tape drive. The computer-implemented method further includes. The computer-implemented method further includes identifying a tape head position with respect to the tape, wherein the tape includes a data partition and an index partition. The computer-implemented method further includes identifying a first position and a second position on the tape. The computer-implemented method further includes determining a first distance, wherein the first distance is a length of tape between the first position and the tape head position. The computer-implemented method further includes determining a second distance, wherein the second distance is a length of tape between the first position and the second position. The computer-implemented method further includes determining the first distance is less than the second distance. The computer-implemented method further includes repositioning the tape to a primary section of the index partition. The computer-implemented method further includes writing the metadata index, wherein the metadata index is included in the index partition. The computer-implemented method further includes repositioning the tape to the second position of the data partition where the at least one updated data file was written. The computer-implemented method further includes writing a data index beginning at the second position of the data partition.

According to one embodiment of the present invention, a computer-implemented method for unmounting a tape from a tape drive is disclosed. The computer-implemented method includes receiving a request to unmount the tape from the tape drive. The computer-implemented method further includes determining that at least one update has been made to the tape since the tape has been mounted to the tape drive. The computer-implemented method further includes. The computer-implemented method further includes identifying a tape head position with respect to the tape, wherein the tape includes a data partition and an index partition. The computer-implemented method further includes identifying a first position and a second position on the tape. The computer-implemented method further includes determining a first distance, wherein the first distance is a length of tape between the first position and the tape head position. The computer-implemented method further includes determining a second distance, wherein the second distance is a length of tape between the first position and the second position. The computer-implemented method further includes determining the first distance is greater than the second distance. The computer-implemented method further includes repositioning the tape to the second position of the data partition. The computer-implemented method further includes writing a data index in beginning at the second partition of the data partition. The computer-implemented method further includes repositioning the tape to the primary section of the index partition. The computer-implemented method further includes writing a previous metadata index written to the index partition with a new metadata index, wherein the new metadata index information associated with the at least one update made to the tape.

According to another embodiment of the present invention, a computer system for unmounting a tape from a tape drive is disclosed. The computer system includes one or more computer processors, one or more computer readable storage media, and program instructions stored on the computer readable storage media for execution by at least one of the one or more processors. The program instructions include instructions to receive a request to unmount the tape from the tape drive. The program instructions further include instructions to determine that at least one update has been made to the tape since the tape has been mounted to the tape drive. The program instructions further include instructions to responsive to the determination. The program instructions further include instructions to identify a tape head position with respect to the tape, wherein the tape includes a data partition and an index partition. The program instructions further include instructions to identify a first position and a second position on the tape. The program instructions further include instructions to determine a first distance, wherein the first distance is a length of tape between the first position and the tape head position. The program instructions further include instructions to determine a second distance, wherein the second distance is a length of tape between the first position and the second position. The program instructions further include instructions to determine the first distance is less than the second distance. The program instructions further include instructions to reposition the tape to a primary section of the index partition. The program instructions further include instructions to write the metadata index, wherein the metadata index is included in the index partition. The program instructions further include instructions to reposition the tape to the second position of the data partition where the at least one updated data file was written. The program instructions further include instructions to write a data index beginning at the second position of the data partition.

DETAILED DESCRIPTION

Linear tape open (LTO) is a magnetic tape data storage system that allows for a cost-effective method of using tape drives to store large amounts of data long term. While many magnetic tape data storage systems include traditional formatted tape, LTO storage systems have additional tape structures to enhance the data storage experience. The most current generation of LTO storage systems can include up to four data bands, in which the full width of the tape is divided into four data bands extending horizontally throughout the length of the tape. Each of the four data bands is separated by a narrow servo band on either side (for a total of 5 narrow servo bands). Servo bands provide location information to the tape head as it reads and writes data within a specific data band. Tape heads generally span the width of one data band and the adjacent (i.e., top and bottom) servo bands, and move in a vertical direction across the width of the horizontally oriented tape. Tape head position is controlled by the system of servo bands and the information encoded in each servo band during manufacturing. While the tape head moves vertically across the width of the tape, the tape can be moved horizontally along its length (i.e., by winding and unwinding the tape on reels) allowing the tape head to interact with different portions of the tape.

Often, LTO formatting specifies each servo band to have a specific number of nominal servo positions or elements (e.g., LTO formatting usually includes 6 servo elements). Each of the nominal servo positions located in each of the servo bands are separated at particular distances corresponding to the distance separating tracks within the data band. Generally, nominal servo positions are specific vertical positions within a servo band that extend the horizontal length of the tape alongside the data bands. Tape heads can be configured to have a plurality of read/write tape head elements (e.g., a set of 8, 16, or 32 data read/write tape head elements) and at least two servo read elements. Tape heads configured in such a manner are able to use the nominal servo positions of each data band's adjacent servo band to accurately read and write data. As the tape head and tape interact, the tape head receives location information from each of the data band's adjacent top and bottom servo bands. The LTO storage system then uses these two independent location information sources to accurately position the tape head in respect to a particular tape location.

LTO formatted tape generally uses a serpentine recording method to write data in each data band. The linear serpentine recording method uses the servo bands and the nominal servo positions to create tracks and wraps. A wrap is a group of tracks, each track of the group acts as a data sub-band, recorded in the physical forward or physical reverse direction along the length of the tape. The number of tracks or wraps each data band has depends on the number of nominal servo positions the tape was designed to have. LTO tape systems are further designed to have longitudinal positions. Longitudinal positions are specific positions that extend vertically along the width of the tape and are dispersed at specific parts of the tape to provide position data (e.g., where the beginning of the tape and end of the tape are). Longitudinal positions can be configured using various tape elements and servo band elements, such as those referenced above.

During an exemplary writing operation in a LTO tape system, the tape head begins writing data near the beginning of the tape at a specific longitudinal position and track within a data band. This longitudinal position indicates the earliest portion of the tape where data can be written and is often referred to as Longitudinal Position 3 ($LP_3$). The tape head maintains a consistent vertical position as it writes data to the track. The location of the horizontally extending track is determined by the nominal servo positions within the specific data band and where data has previously been stored. The tape head then continuously writes data to the tape as the tape is moved horizontally, from the beginning of the tape (BOT) toward the end of the tape (EOT), or in the forward direction. When the tape head senses it is approaching the longitudinal position near the EOT, often referred to as Longitudinal Position 4 ($LP_4$), the tape head is moved to a new vertical position (consistent with the serpentine recording method) determined by nominal servo positions within the servo band. When the tape head is correctly positioned, the tape head begins writing data in the reverse direction (i.e., from the EOT toward the BOT) to form another track of data. The track writing data in the forward direction and the next track writing data in the reverse direction are often referred to as a wrap. When the tape head reaches $LP_3$, the tape head again vertically shifts (consistent with the serpentine recording method) to write data in a track, to form the beginnings of a new wrap, toward the EOT (i.e., from the BOT toward the EOT). LTO is a sequential access medium, meaning that as new data is written to a track within the data band, the new data is added by appending the data object most recently written and stored on the tape. Depending on LTO tape specifications, a tape may have a plurality of wraps, each wrap capable of storing two tracks of data in the forward and reverse direction.

Since the advent of LTO tape technology, tape filing systems have undergone further formatting to control how data is stored and retrieved from tape memory. One beneficial development that increases the usability of LTO tape technology is the additional formatting known as partitioning. Tape partitioning includes segmenting tapes into different logical partitions that can be configured to support independent write operations without altering data stored on other partitions. LTO tape technology can be formatted to include two or more tape partitions that extend the length of the writable tape area. Partitions can be formatted to be any size, but since partitions are allocated as complete wraps, the smallest possible partition size is one wrap (i.e., a forward track and a reverse track). Each partition is separated from other tape partitions by a guard wrap. A guard wrap includes at least one entire wrap extending the length of the tape where data cannot be written. Guard wraps ensure that data written to one partition does not interfere with a neighboring partition data by ensuring there is sufficient distance between the two partitions. While tape partitioning has many benefits, tapes having more than one partition can often have a reduction in performance. This reduction in performance is caused by an increase in tape movement, from one terminal end to the other, as the tape head performs longitudinal data seeking operations to locate specific data blocks for read/write operations on each of the different partitions. One possible solution includes further formatting LTO tape and the associated partitions to reduce tape movements associated.

One such tape filing system is the Linear Tape Filing System (LTFS). LTFS and other similar tape data storage systems utilize tape partitioning and LTO tape technology to make tape filing systems self-describing. LTFS formatted tape combines indexing techniques with partitioning to allow data to be easily and quickly recalled from memory without the tape drive having to read the entire tape beginning to end. Generally, LTFSs are partitioned into at least two partitions, an index partition and a data partition, each having the same longitudinal positions (i.e., $LP_3$ and $LP_4$) designating where data can be written. The index partition is usually designed to have a small data volume of one or two wraps while the data partition's data volume consists of the remaining available wraps (e.g., the total available number of wraps on the tape, minus the index partition wraps and guard wraps).

LTFS formatted tapes utilize indexing and have two types of indexes, metadata indexes and data indexes. Each of the metadata index and data index include XML data structures that describe all data files, directory information and associated metadata for files recorded to the LTFS tape volume. For example, metadata index and data indexes can include file timestamps, file permissions, file names, and the longitudinal locations of each data extent holding part of the file content. A data extent is a set of one or more sequential logical blocks used to store file data. In some embodiments, metadata indexes and data indexes further include various file components (e.g., file markers and labels), generation numbers and pointers. Each time an LTFS formatted tape is mounted and modified, a new generation of metadata index and data index are written to the tape to reflect these updates and modifications. A generation number is a non-negative integer assigned to the metadata index and data index that increases after each new generation of metadata index and data index are written to reflect the age of the new indexes compared to older indexes. Metadata index and data index can also include self pointers and back pointers. Self pointers record the partition volume and position to which metadata index or data index belongs to. Back pointers record the block position of the previous immediate generation of metadata index and/or data index present on the LTFS volume. If properly implemented, metadata indexes and data indexes should form an unbroken chain of back pointers.

Metadata indexes and data indexes, having the same generation number, contain the same information describing the tape volume and its contents (general examples previously provided). Metadata indexes are written to the index partition near the BOT at $LP_3$. This allows the metadata index to be one of the first instructions read once a tape cartridge, having a single reel, has been mounted to a tape drive. Having metadata index located near the BOT reduces tape movement by reducing the need for longitudinal data seeking operations, where the entire length of tape would need to be read before a full accounting of the tape's contents could be provided. While the index partition under some circumstances may include data files or data objects for quick file access, because of the small data volume available, it is predominately used for recording different generations of metadata indexes. Each time the tape is modified in some way, a new metadata index is written to accurately reflect the information stored on the tape. The new metadata index is written over the old outdated metadata index, allowing the newest metadata index generation (i.e., metadata index with the highest integer) that reflects the most accurate or recent accounting of the LTFS tape volume contents to be located near the BOT. While a user may provide instructions designating how often a metadata index should be written, if the tape has been modified, a metadata index and a data index are usually written during "unmount" operations.

Data indexes are written to the data partition of the LTFS formatted tape volume. Because LTO tape technology is a sequential recording media, after the tape volume has been modified, a data index is written to append the most recently written data file or object in the data partition. Traditionally, data indexes, in contrast to metadata indexes, do not write over existing data or previous generations of data indexes. As previously mentioned, metadata indexes and data indexes having the same generation integer contain the same tape content describing information. While previous generations of metadata indexes are deleted as they are replaced, each generation of data index has a back pointer to its immediate predecessor. As a result, data indexes not only act as a form of redundancy in case of damage or failure of the metadata index, but also allow users to revert the tape volume, using the chain of back pointers, to a previous version of the data stored on the tape. Once the desired data modifications are completed and access to the tape is no longer necessary, the tape cartridge may be unmounted. In order for proper unmounting to occur, the data partition and index partition must be considered complete. Data partition and index partition are only considered complete if they have been properly indexed with their respective metadata index and data index.

As discussed generally herein, magnetic tape storage is a low cost long term storage solution for data that need not be accessed frequently (e.g., data backups or archiving data). However, a trade-off exists in that read/write performance for tape storage is slower than that of more expensive (per byte stored) high speed storage devices (e.g., solid state drives and hard disk drives). In order to maximize the read/write performance of tape storage, tape media is typically wound and unwound at a high tension. However, as the tension at which the tape media is wound and unwound increases, so too does the likelihood of physical stretching of the tape. Physical stretching of the tape particularly affects tape media wound at high tension that is then stored or archived for long periods of time. Physical stretching of the tape media can result in data errors and even data loss.

One possible solution to reducing the physical stretching of the tape is to perform "unthread" operations at low tension. Low tension can be any tension that reduces the stretching of the tape media. Unthreading the tape from the tape drive at low tension reduces stretching of the tape media, but requires a significant amount of time to complete the operation. As a result, unthreading at low tension can be selectively chosen for situations when a tape is intended for long term storage.

Embodiments of the present invention recognize that even if unthreading at low tension is limited to situations where the tape is intended for long term storage, this process, when combined with proper indexing can still result in significant time delay caused by the tape drive having to make multiple passes of the entire length of the tape. As a result, efforts are being made to reduce tape movement and the need for the tape to make multiple lengthwise passes. Embodiments of the present invention reduce tape movement when performing an unmount operation by considering distances between specific longitudinal positions on the tape in relation to the tape head, thereby reducing the number of tape movements while still completing both the index partition and data partition by performing proper indexing (i.e., metadata index and data index, respectively) prior to unthreading the tape.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
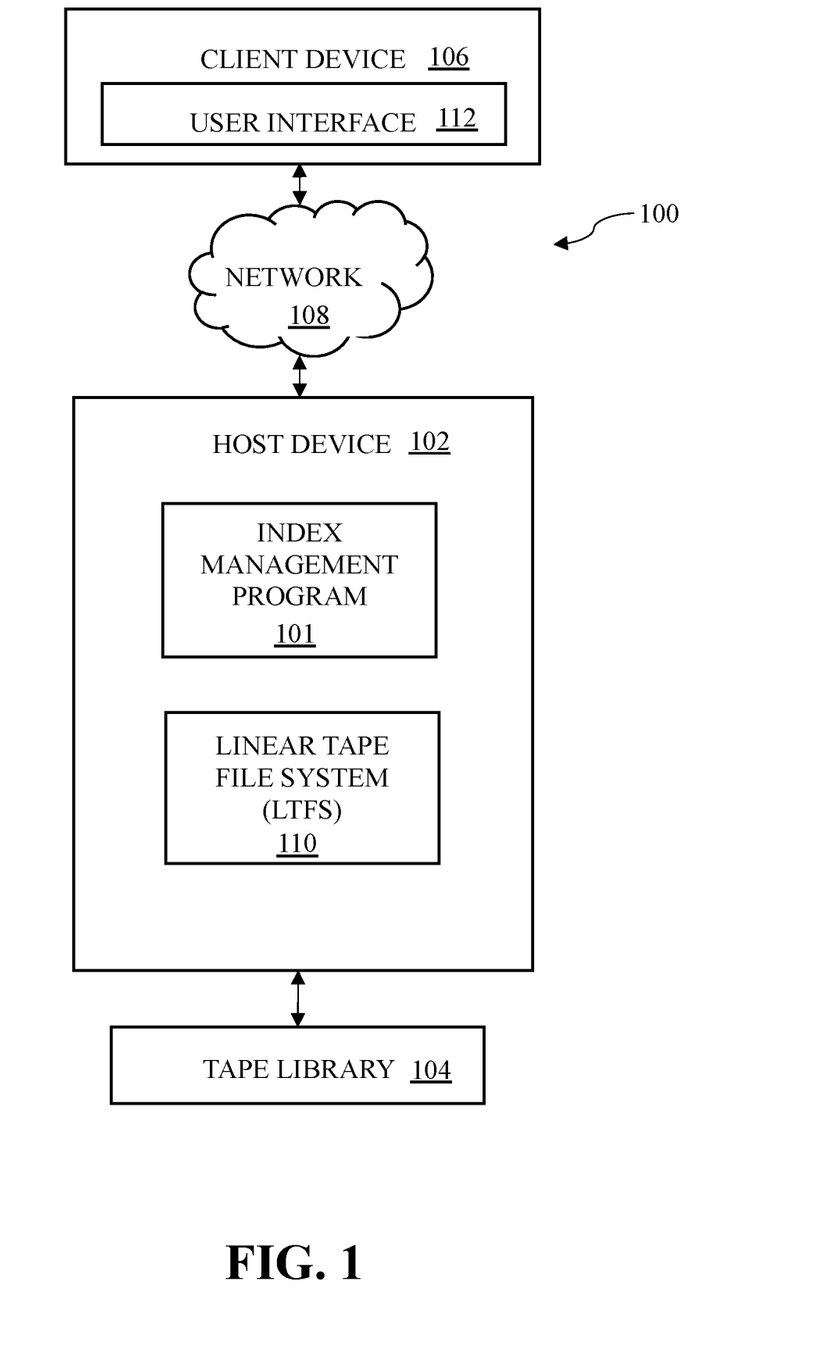
FIG. 1 is a functional block diagram of a computing environment, generally designated 100, suitable for operation of an index management program 101 in accordance with at least one embodiment of the invention.

Referring now to various embodiments of the invention in more detail, FIG. 1 is a functional block diagram of a computing environment, generally designated 100, suitable for operation of index management program 101 in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

Network environment 100 includes host device 102, tape library 104, and client device 106 interconnected over network 108. In embodiments of the present invention, network 108 can be a telecommunications network, a local area network (LAN), a wide area network (WAN), such as the Internet, or a combination of the three, and can include wired, wireless, or fiber optic connections. In some embodiments, network 108 is a storage area network ("SAN"). Network 108 may include one or more wired and/or wireless networks that are capable of receiving and transmitting data, voice, and/or video signals, including multimedia signals that include voice, data, and video information. In general, network 108 may be any combination of connections and protocols that will support communications between host device 102, tape library 104, client device 106, and other computing devices (not shown) within computing environment 100.

In various embodiments of the present invention, host device 102 is a computing device that can be a standalone device, a management server, a web server, a mobile device, or any other electronic device or computing system capable of receiving, sending, and processing data. In other embodiments, host device 102 represents a server computing system utilizing multiple computers as a server system, such as in a cloud computing environment. In an embodiment, host device 102 represents a computing system utilizing clustered computers and components (e.g. database server computers, application server computers, web server computers, etc.) that act as a single pool of seamless resources when accessed within computing environment 100. In general, host device 102 represents any programmable electronic device or combination of programmable electronic devices capable of executing machine readable program instructions and communicating with index management program 101, tape library 104, client device 106, linear tape file system (LTFS) 110, and other computing devices (not shown) within computing environment 100 via a network, such as network 108.

Host device 102 includes linear tape file system (LTFS) 110. As described previously herein, a LTFS is a file system that allows files stored on tape media to be accessed in a similar manner as files stored on a hard disk or flash drive. LFTS requires both a specific format of data on the tape media and software to provide a file system interface to the data. Each LTFS formatted tape media in the tape library appears as a separate folder under the filesystem mount point. One of ordinary skill in the art will appreciate that applying a file system to a tape drive allows users to organize and search the contents of tape media as they would on hard disk, improving access time for data stored on tape media. For example, LTFS 110 can be an IBM Linear Tape File System-Library Edition (LTFS-LE) that allows LTFS volumes (i.e., tape media) to be used with a tape library, such as tape library 104. While reference is made to IBM-specific hardware and/or software components, it should be understood that aspects of the present invention may be applied equally to other linear tape storage technologies.

Host device 102 further includes index management program 101. Although index management program 101 is depicted in FIG. 1 as being integrated with host device 102, in alternative embodiments, index management program 101 can be remotely located from host device 102. In some embodiments, index management program 101 can be a component of LTFS 110. For example, index management program 101 can be a software component or sub-system of LTFS 110. In other embodiments, index management program 101 can be logically distinct from LTFS 110. For example, index management program can be an application running outside of programming associated with LTFS 110 software. Alternatively, in other embodiments LTFS 110 can be a software subcomponent of index management program 101.

Tape library 104 can be an automated tape storage device that includes a plurality of tape drives for writing to and reading from tape media, such as, but not limited to, single-reel or two-reel magnetic tape cartridges. In an embodiment, tape library 104 can be an IBM TS3400™ Tape Library or an IBM TS3500™ Tape Library. While reference is made to IBM-specific hardware and/or software components, it should be understood that aspects of the present invention may be applied equally to other tape library technologies. In embodiments of the invention, tape library 104 can include a plurality of tape media stored in banks or groups of storage slots. For example, tape media may include, but is not limited to magnetic tape cartridges, magnetic tape cassettes, and optical tape cartridges. Tape library 104 can further include a plurality of slots to hold tape media (e.g., tape cartridges), a barcode reader to identify tape media and an automated method (e.g., a robot) for loading tape media.

Client device 106 can allow a user to access an application running on host device 102 and/or communicate with index management program 101 via a network, such as network 108. Client device 106 may be a laptop computer, a tablet computer, a netbook computer, a personal computer (PC), a desktop computer, a personal digital assistant (PDA), a smart phone, or any programmable electronic device capable of receiving, sending, and processing data. In general, client device 106 represents any programmable electronic device or combination of programmable electronic devices capable of executing machine readable program instructions and communicating with host device 102, tape library 104, and other computing devices (not shown) within computing environment 100 via a network, such as network 108.

Client device 106 can include user interface 112. User interface 112 can provide an interface between client device 106, host device 102, and tape library 104. In some embodiments, user interface 112 can be a graphical user interface (GUI) or a web user interface (WUI) and can display text, documents, web browser windows, user options, application interfaces, and instructions for operation, and includes the information (e.g., graphic, text, and sound) presented to a user and the control sequences the user employs to control the program. In some embodiments, user interface 112 can be mobile application software that provides an interface between client device 106, host device 102, and tape library 104.

Figure 2:
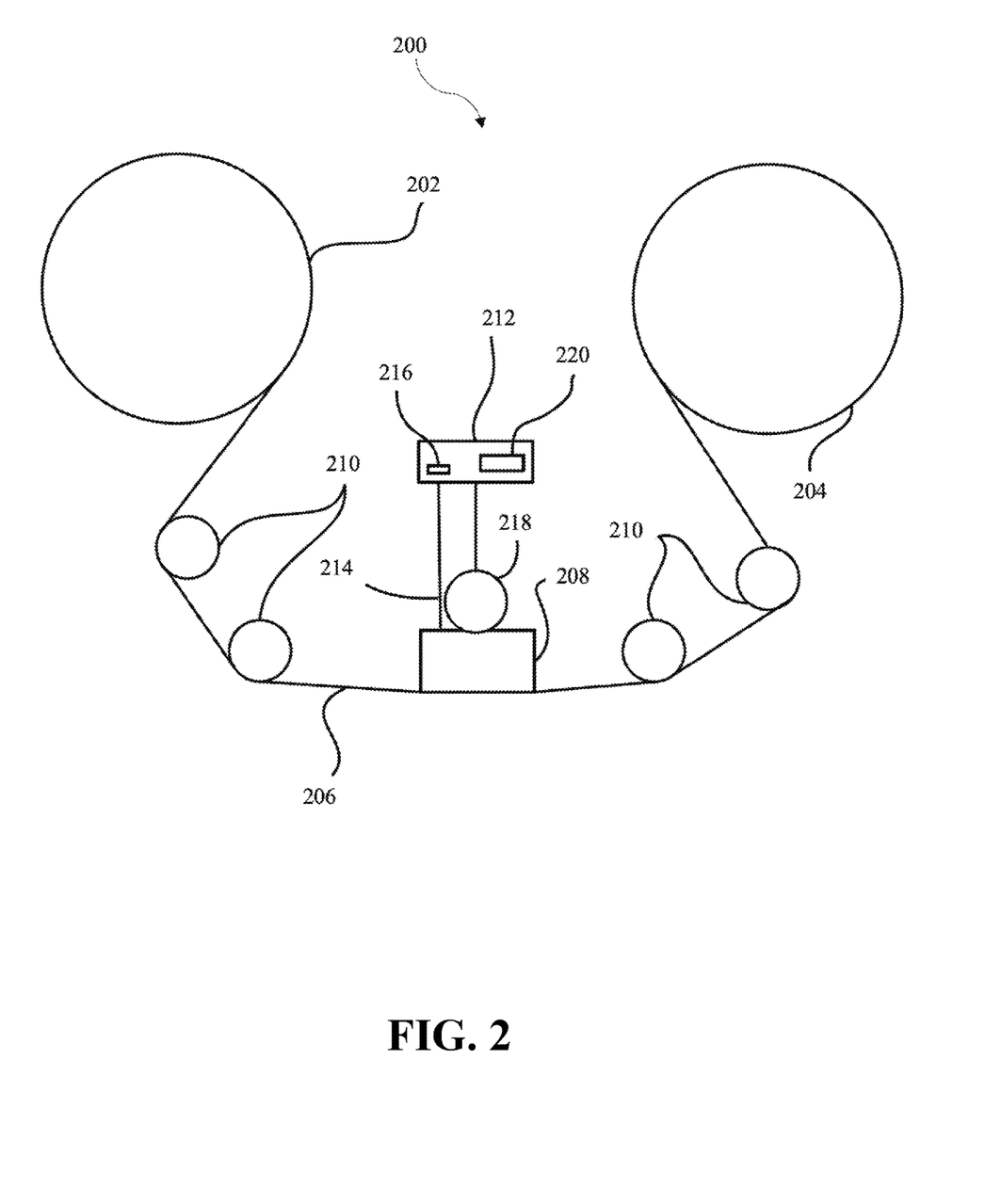
FIG. 2 is an exemplary simplified tape drive, generally designated 200, in accordance with at least one embodiment of the present invention.

FIG. 2 illustrates an exemplary tape drive, generally designated 200, in accordance with at least one embodiment of the present invention. While tape drive 200 shows one tape drive device, any tape drive configured to perform read/write operations on magnetic tape may be used. Furthermore, tape drive 200 can include any electronic device or combination of electronic devices, capable of executing computer readable program instructions and read/write operations on magnetic tape. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

As shown in FIG. 2, tape supply cartridge 202 and take-up reel 204 are provided to support tape 206. Tape 206 can be any magnetic tape media configured to have at least two partitions (See FIG. 3). One or more of the reels may form part of a removable cartridge that is not necessarily part of tape drive 200. For example, tape supply cartridge 202 can be a single reel holding the complete wound length of tape 206. Tape supply cartridge 202 can be housed in a tape cartridge (not shown) and stored separately from tape drive 200 until needed. Tape drive 200 can include additional drive motor(s) to drive the tape supply cartridge 202 and the take-up reel 204 to move tape 206 lengthwise in a horizontal direction over tape head 208 from BOT to EOT and the reverse. Tape head 208 can be any tape head capable of reading and/or writing data to tape 206. To read data stored at a particular location on tape 206, the tape drive 200 physically winds the tape between tape supply cartridge 202 and take-up reel 204, moving tape 206 horizontally over tape head 208. This allows tape head 208 to directly interact in order read that specific piece of data stored at a particular location on tape 206.

Guides 210 guide tape 206 across tape head 208. Tape head 208 is in turn coupled to a controller 212 via a cable 214. In some embodiments controller 212 is a processor and controls any necessary subsystems of tape drive 200. In other embodiments, controller 212 controls head functions such as servo following, data writing and data reading. Controller 212 can include at least one servo channel and at least one data channel, each of which include data flow processing logic configured to process and/or store information to be written to and/or read from the tape 206. Controller 212 can utilize logic known in the art, as well as any logic disclosed herein, and can be considered as a processor for any of the descriptions of tape drives included herein, in various approaches. Controller 212 can be coupled to memory 216 of any known type, configured to store instructions executable by the controller 212. Moreover, controller 212 may be configured and/or programmable to perform or control some or all of the methodology presented herein. As a result, controller 212 can be considered to be configured to perform various operations by way of logic programmed into one or more chips, modules, and/or blocks; software, firmware, and/or other instructions being available to one or more processors; etc., and any possible combinations thereof.

Cable 214 includes read/write circuits to transmit data to tape head 208 to be written to tape 206 and to receive data read by tape head 208 from tape 206. Actuator 218 controls the positioning of tape head 208 relative to tape 206. In some embodiments, actuator 218 can control vertical movement of tape head 208 across the width of tape 206. An interface 220 may also be provided to enable communication between tape drive 200 and a host device (internal or external). Such communication may allow tape drive 200 to transmit and receive data, as well as receive instructions from index management program 101 and/or other programing associated with tape storage management systems, such as LTFS 110.

Tape drives move tape 206 over the surface of tape head 208 at high speeds. Moreover, tape head 208 is usually designed and positioned to minimize the spacing between tape 206 and tape head 208. Minimizing the spacing between tape 206 and tape head 208 allows the transducers of tape head 208 to have the read/write elements in near contact with tape 206 and ensures effective coupling of the magnetic field from the tape to the read/write elements (i.e., in order to optimize read/write performance).

In some embodiments, as referenced above, tape 206 can be stored on one or more reels inside a removable cartridge separate from tape drive 200 (i.e., unthreaded from tape drive 200). Because of the minimal spacing between tape 206 and tape head 208, stiction often occurs when the tape is idle in tape drive 200. Stiction can result from a buildup of static friction between the tape and tape head, affecting tape movement. When the tape begins moving, the stiction created between tape and tape head has been known to result in tape breakage rather than separate from the tape head. One solution to this problem is to unthread tape 206 from tape drive 200 when tape 206 is not in use. The ability to unthread tape 206 from tape drive 200 into a tape cartridge enables data to be stored for long periods with minimal hardware and device volume. Tape cartridges can be stowed in storage slots or in data storage libraries (e.g., archival storage).

Generally, a variety of operations can be executed on tape 206, including, but not limited to "loading," "unloading," "thread," "unthread," "mount," and "unmount." A tape cartridge may be "loaded" by inserting the tape cartridge into a tape drive and "unloaded" by removing the tape cartridge from the tape drive. Once loaded in tape drive 200, tape 206 may undergo a "thread" operation. "Thread" operations usually include physically passing the BOT of tape 206 (i.e., the outer most tape terminal of the wound tape on the tape supply cartridge reel) thorough tape drive 200 from tape supply cartridge 202 to take-up reel 204 located in tape drive 200. After the "thread" operation is successfully completed, tape 206 is properly positioned over tape head 208 and can be "mounted."

"Mount" operations generally include making data files and file system structures stored on a tape 206 available for users to access via a storage system's file system (e.g., LTFS). When access to tape 206 is no longer required, tape 206 may be "unmounted." "Unmount" operations generally include storing information (e.g., metadata) and data to the tape medium for use in accessing files on the tape medium when the tape is next "mounted." "Unthread" operations generally include removing tape 206 from take-up reel 204 and removing the tape 206 from tape drive 200. In addition to the operations discussed herein, many variations and modes of each operation exist and may be executed under specific circumstances. As such, some or all of these operations can be executed independently of the others. Alternatively, some or all of these operations can be executed concurrently and/or overlap.

Figure 3:
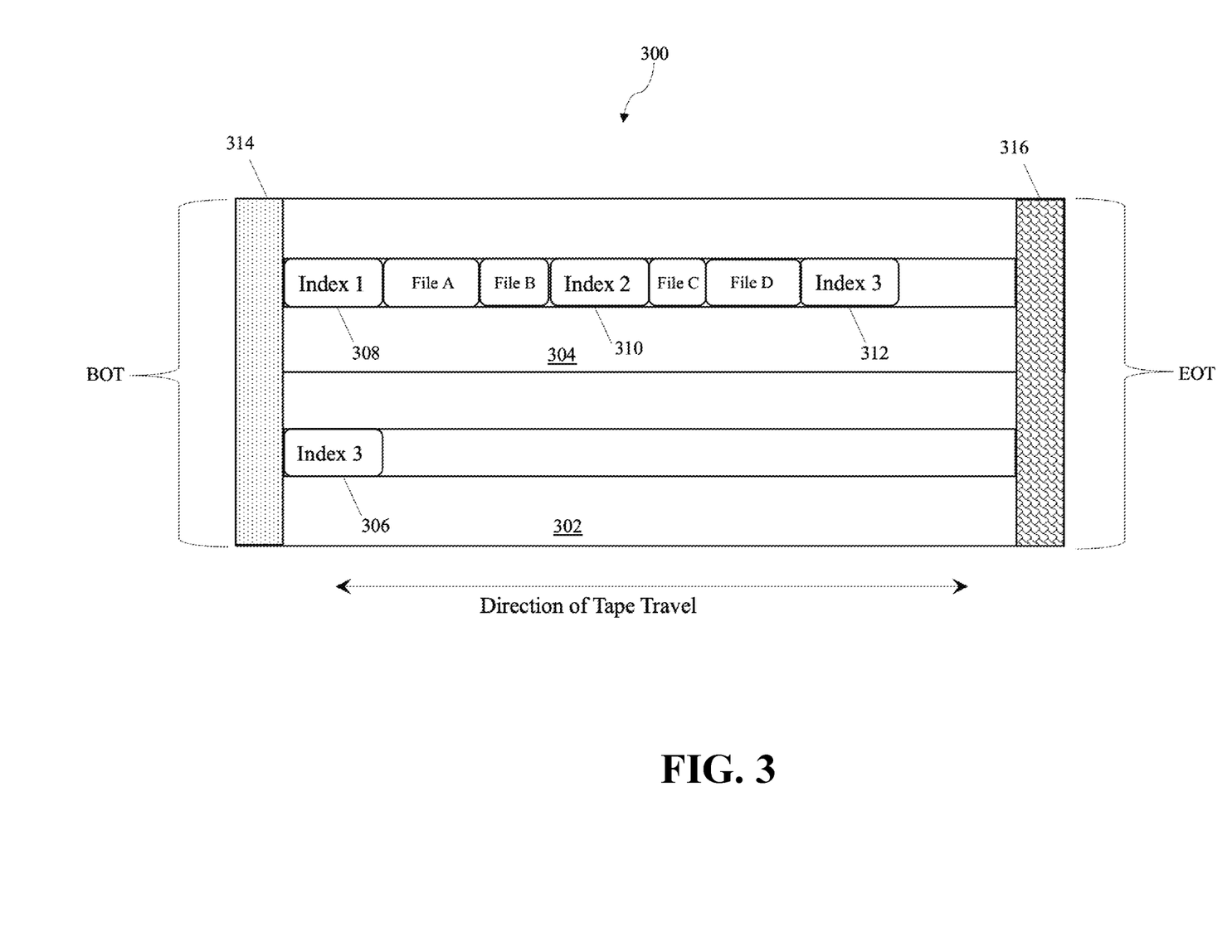
FIG. 3 is an exemplary sequential access magnetic tape having partitions, generally designated 300, in accordance with at least one embodiment of the present invention.

FIG. 3 is an exemplary block diagram illustrating a conventional magnetic tape 300 formatted to have partitions (e.g., LTFS formatted tape). FIG. 3 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, partitioned magnetic tape 300, hereinafter referred to generally as tape, may be LTFS formatted. Generally, LTFS format includes at least two partitions commonly referred to as index partition 302 and data partition 304. Index partition 302 is used to store indexes having metadata associated with data stored in the data partition. Metadata indexes 306, or those indexes written to index partition 302, can have a variety of metadata including, but not limited to, a directory of all the data files stored on tape 300 and/or file size. The LTFS format allows for metadata index 306 to be recorded in the index partition 302 at longitudinal position 314 near the BOT. Longitudinal position 314, usually referred to as Longitudinal Position 3 ($LP_3$), is a vertical position on tape 300 indicating to tape drive 200 the "earliest" position near BOT where data can be written in both, index partition 302 and data partition 304. Data partition 304 has all of the data files written to tape 300 as well as a copy of all the indexes comprising metadata. Indexes written in the data partition, for clarity are referred to herein as data indexes (i.e., data indexes: Index 1 308, Index 2 310, and Index 3 312 are written to data partition 304) while metadata indexes are those written to index partition 302 (i.e., Index 3 (metadata index) 306).

Continuing with FIG. 3, in an exemplary writing operation, tape 300 has recently been updated to include File D in data partition 304. Tape 300 is a sequential access medium, meaning that as new data is written to data partition 304, new data is added by appending the data at the end of previously written data. After new data (i.e., File D) has been added to data partition 304, Index 3, having metadata regarding the update, is written in both the data partition 304 and the index partition 302. While in some embodiments metadata index 306 and data index 312 have the same information, in other embodiments metadata index 306 and data index 312 have different information.

Moreover, as index information is updated, an updated metadata index 306 (i.e., Index 3) overwrites the previous version of the metadata index (Index 2, not depicted in FIG. 3) including outdated information in index partition 302 to correctly reflect the most current tape data accessible to a user. By overwriting the outdated metadata index (Index 2), the new metadata index 306 (i.e., Index 3) is approximately located at $LP_3$ 314 in the index partition near the BOT. Writing metadata index 306 at $LP_3$ or near the BOT allows metadata index 306 to be easily read when tape 300 is "loaded" and/or "threaded" into tape drive 200. This enables a user to quickly receive information regarding data stored on the tape and, once user selects a file to be read/written, for the file to be quickly found using the information stored in metadata index 306.

As further depicted in FIG. 3, updated data index 312 (i.e., Index 3) is written in data partition 304 and is appended to the most recently recorded data files. In most embodiments, data and indexes written in data partition 304 cannot be overwritten. As a result, all previously written, but outdated data indexes 308 and 310 (i.e., Index 1 and Index 2, respectively) remain stored on tape 300 in data partition 304. This process can be viewed in FIG. 3, where all versions of data indexes 308, 310, 312 (i.e., Index 1, Index 2, Index 3, respectively) as well as data File A, File B, File C, File D are recorded and stored in data partition 304 of tape 300. Although data index 308 (Index 1) and data index 310 (Index 2) are old indexes (i.e., outdated), because information is written to tape by appending it to the end of the previously written data as described above, these old indexes remain stored on the tape 300 in the data partition 304 without being overwritten. Data and data indexes continue to be written to data partition 304, in $LP_3$ 314 toward Longitudinal Position 4 316 ($LP_4$) located near EOT. Once the written data approaches $LP_4$ 316, tape head 208 shifts vertically (consistent with the serpentine recording method) and continues writing data from $LP_4$ 316 toward $LP_3$ 314.

In an embodiment, the old indexes interweaved between data, can include a chain of back pointers to older index versions allowing LTFS to walk back through the array of older indexes. In other words, if a user decides they want to revert to an earlier version of data stored on of tape 300, LTFS can navigate back through the old data indexes (e.g., Index 1 and Index 2) written in data partition 304 and make that version of tape data available to the user. Additionally, by writing an updated index in both index partition 302 and data partition 304, tape 300 may be mounted using the metadata recorded in data index 312 and can act as a backup option.

Traditional magnetic tape storage devices have combined winding and unwinding tape at high speeds with high tension to reduce the time necessary to access particular tape locations for data read or write access. Winding and unwinding at high speeds and high tension allows the tape to be quickly and properly positioned in relation to the tape head, even when required data files are located at disparate tape terminals. Enabling quickly accessible data allows tape media to act as a practical storage medium and increases usability. Reducing the high speed and/or high tension of the tape in a tape drive results in an inefficient system that creates significant operational delays for users.

As discussed generally herein, magnetic tape storage devices can be used to archive data for long term storage. In various magnetic tape data storage devices, winding and unwinding the tape at high tension to read/write data before storing the tape for long term storage can cause the tape to physically stretch. When this type of tape-wear occurs, data can form errors or may be lost in its entirety. Because LTFS formatted tape drives require two different indexes to be written at two different locations on the tape, possibly located on opposite tape terminals, special care is taken. To accommodate the need for high speed and high tension, but also taking into consideration the aforementioned issues of tape-ware associated with high tension, specific "unthread" operations have been developed that results in the low tension winding onto the single reel cartridge during "unmount" operations before archival.

In situations where a LTFS formatted tape is intended for long term storage, particular steps should be taken during the "unmount" operation but before the "unthread" operation to ensure the tape is properly indexed. Indexing often occurs during "unmount" operations if the tape has been modified (e.g., altering of files and/or metadata) since it was mounted. During "unmount" operations, the position of tape head 208 in relation to tape 300 may be located at any longitudinal position on tape 300. The position of tape head 208 in relation to tape 300 is likely dependent on the most recent read/write operation. If tape head 208 most recently wrote new data (e.g., File D) to tape 300, then during an "unmount" operation tape head 208 may be proximately positioned to the tape location where most recently added data was written. If tape head 208 most recently read written data, then during an "unmount" operation tape head 208 may be positioned, in relation to tape 300, randomly along the length of tape 300.

Once an "unmount" operation has been initiated and it has been determined that tape 300 has been modified since mounting, tape head 208 is positioned to the most recently updated portion of data partition 304 and data index 312 (e.g., Index 3) is written in an appending manner. Data index 312 should be written to tape 300 consistent with the serpentine recording method (i.e., appending the most recently written files). A combination of controlling the horizontal movement of tape 300 (via tape supply cartridge 202 and a take-up reel 204) and the vertical movement of tape head 208 across the width of tape 300, allows tape head 208 to be precisely positioned at the appropriate data band and track/wrap position (not shown).

After data index 312 is written, tape 300 is moved horizontally until tape head 208 is positioned proximate to $LP_3$ 314 near BOT of index partition 302. Once tape head 208 is properly positioned to $LP_3$ 314, tape head 208 overwrites old/outdated metadata Index 2 (not shown) with new/updated metadata index 306 (e.g., Index 3). As discussed above, controlling the horizontal movement of tape 300 and the vertical movement of tape head 208 across the width of tape 300 allows tape head 208 to be precisely positioned. When metadata index 306 overwrites outdated metadata index at $LP_3$ 314 near BOT, approximately the complete length of tape 300 is wound with high tension on tape supply cartridge 202 (a single reel housed inside the removable cartridge (not shown) that is considered separate from tape drive 200).

The benefits of unthreading tape 300 at low tension are often achieved only if the entire reel of tape is wound at low tension on tape supply cartridge 202 (i.e., the single reel in the removable tape cartridge). After both data index 312 and metadata index 306 are properly written, tape 300 begins an "unthread" operation at low tension. To properly "unthread" tape 300 from tape drive 200, tape 300 should be horizontally moved and repositioned in such a way as the EOT can interact with tape head 208 and/or other tape drive 200 components. This repositioning requires tape 300 to traverse its entire tape length, from the BOT (where the metadata index 306 was last written) to the EOT. Initially, immediately after writing metadata index 306, tape supply cartridge 202 holds the bulk of tape 300. As tape 300 is moved horizontally, to allow tape head 208 to interact with EOT, the bulk of tape 300 begins to shift to take-up reel 204. Once the EOT has been reached, tape 300 is then unthreaded from tape drive 200 and wound at low tension on to tape supply cartridge 202. After the "unthread" operation is complete, the "unmount" operation can conclude and the tape cartridge, housing tape 300 (with the most external tape terminus being the BOT) can be ejected from tape drive 200.

Once tape 300 has been properly indexed, tape drive 200 repositions tape 300 to the EOT. In an embodiment, tape 300 is wound on to take-up reel 204 while simultaneously unwinding tape supply cartridge 202. This winding and unwinding, respectively, continues until approximately the complete length of tape 300 is wound on take-up reel 204. Then, Tape 300 and tape drive 200 begin an "unthread" operation by rewinding the tape at low tension from the take-up reel 204 on to tape supply cartridge 202. The "unthread" operation continues until tape 300 is unthreaded from tape drive 200.

While performing an "unthread" operation at low tension during an "unmount" operation is effective at reducing tape stretch and degradation, the process can cause a significant delay. As generally discussed above, tape head 208 is located close to $LP_3$ 314 near BOT. In order to begin the "unthread" operation tape 300 is wound between tape supply cartridge 202 and take-up reel 204 from $LP_3$ 314 (near BOT) to $LP_4$ 316 (near EOT). The "unthread" operation then winds tape 300 from EOT to BOT. The time required to span the length of tape 300 multiple times in addition to the time resulting from winding at low tension can add a significant time delay during "unmount" operations. This delay can significantly reduce the usability of tape as a storage device.

Embodiments of the present invention further reduce tape stretching while also minimizing time delays caused by repositioning the tape from $LP_3$ to $LP_4$ and $LP_3$ to $LP_4$ (i.e., BOT to EOT and EOT to BOT) multiple times during "unmount" operations.

Figure 4:
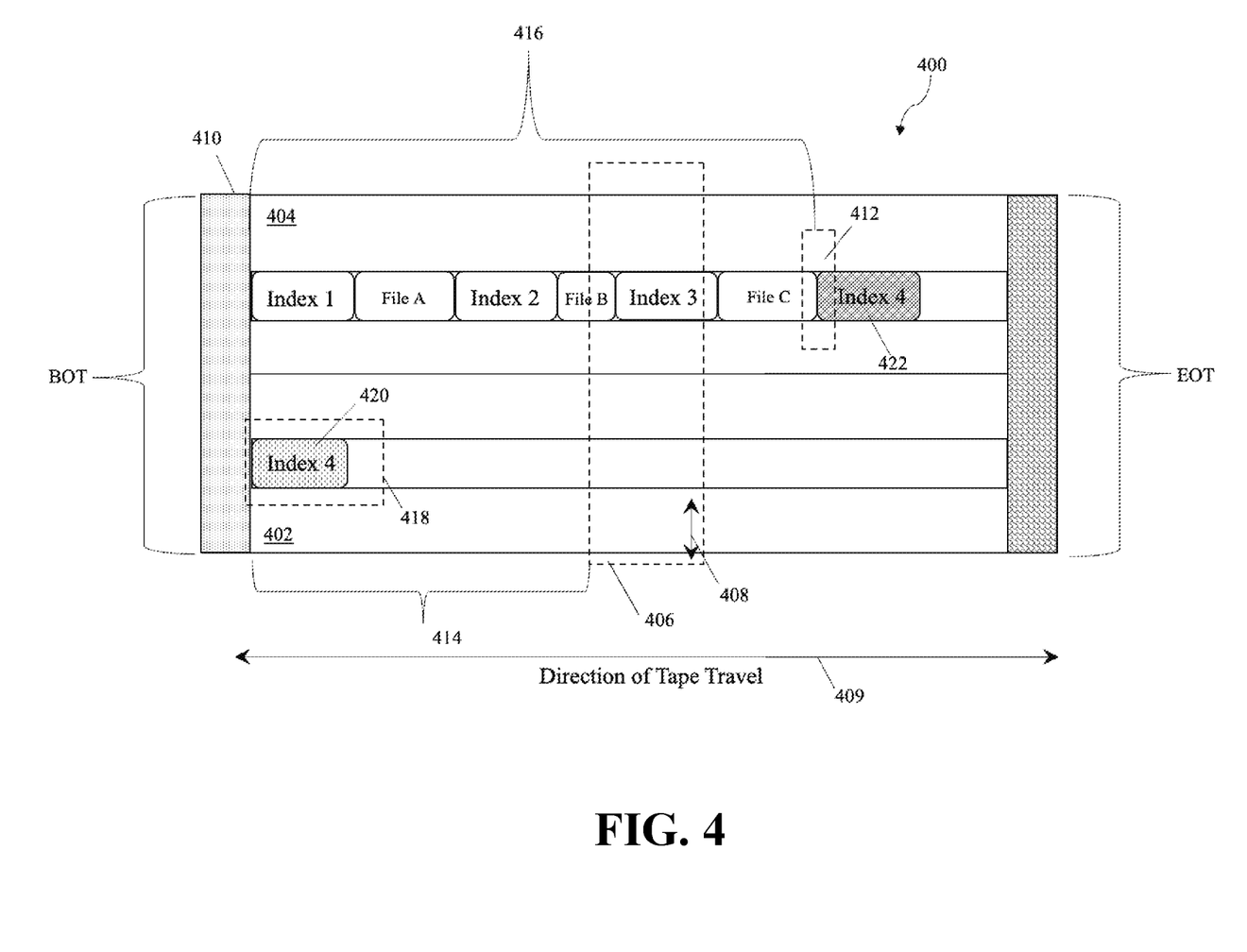
FIG. 4 is an exemplary sequential access magnetic tape having partitions, generally designated 400, in accordance with at least one embodiment of the present invention.

Turning now to FIG. 4, a simplified exemplary embodiment of an updated partitioned tape 400 in accordance with at least one embodiment of index management program 101 during an "unmount" operation is shown. FIG. 4 is similar in structure to tape 300 of FIG. 3 and can include at least all or fewer than all of the same or similar components. Tape 400 is partitioned in at least two partitions, index partition 402 and data partition 404, extending horizontally from the beginning of the tape BOT to the end of the tape EOT. Tape head 406 is used to read and write data to tape 400. Tape head 406 may be configured in any manner described herein and/or known to one skilled in the art.

While FIG. 4 depicts a tape head 406 extending the width of tape 400, the dashed box representing tape head 406 can extend less than the entire width of tape 400. The dashed box representing tape head 406 is used to depict, in an overly simplified manner, the position of tape head 406 in relation tape 400 and to various different tape components (e.g., File C, BOT, EOT, and etc.). Directional arrows 408 demonstrate possible vertical movement of tape head 406 across the width of tape 400. Directional arrows 409 demonstrate possible horizontal movement of tape 400 (i.e., traditional movement of tape 400 is perpendicular to the movement of tape head 406). Tape 400 can be moved in either direction indicated by directional arrows 409. In some embodiments, tape 400 is moved in either direction of tape travel indicated by directional arrows 409 while various operations (e.g., "mount," and "thread" operations) are performed. In some embodiments, tape 400 is moved in either direction of tape travel indicated by directional arrows 409 to position tape head 406 at a particular position or location in relation to tape 400. Tape 400 further includes first position 410 and second position 412.

In various embodiments, first position 410 and second position 412 are two different predetermined longitudinal positions extending vertically across the width of tape 400. Each longitudinal position (i.e., first position 410 and second position 412) provides specific location and position information to index management program 101. More particularly, first position 410 is generally located near BOT and can represent the "earliest" position of tape 400 where data can be written (e.g., $LP_3$). Second position 412 is generally located at the end of the most recently added data file (e.g., File C). Because of the serpentine recording method, the most recently added data file can be located anywhere along the longitudinal length of tape 400.

In embodiments, index management program 101 can determine different tape locations. In these embodiments, index management program 101 can identify tape locations (or positions) including, but not limited to, first position 410, tape head 406 position in relation to tape 400, and second position 412 by retrieving location and position information from the servo bands on tape 400 (not shown). While in some embodiments index management program 101 can instruct tape head 406 to read location and position information captured in the servo bands to determine each desired position, in other embodiments servo bands can be configured to provide unique location information. These embodiments allow index management program 101 to derive, from the servo band location information, the locations and positions of first position 410, second position 412, and current tape head 406 position in relation to tape 400 without requiring tape head 406 to read the entire length of tape 400. Index management program 101 can use the aforementioned information to determine not only tape head position 406 but also the position and distance tape 400 would be required to be moved in order for tape head 406 to interact with either first position 410 or second position 412. Alternatively, some embodiments, can receive data from various tape drive components including, but not limited to, the controller, the tape supply cartridge, and the take-up reel. This data can be used to determine specific tape locations. For example, index management program 101 could configure tape supply cartridge and take-up reel to maintain length and position measurements by taking into consideration the length of tape 400 on each wind and the exponential growth added by tape thickness after each wind is either added or subtracted when tape 400 is moved from one reel to the other during various operations.

In embodiments, index management program 101 can use the aforementioned location and position information to determine a first distance 414 and a second distance 416. First distance 414 can be calculated by determining the length of tape 400 between first position 410 and the position of tape head 406 in relation to tape 400. Second distance 416 can be calculated by determining the length of tape 400 between first position 410 and second position 412.

In embodiments where index management program 101 has determined that first distance 414 is less than second distance 416, index management program 101 repositions tape 400 to a primary section 418 of the index partition 402 and instructs tape head 406 to write a metadata index 420 (i.e., Index 4). In most embodiments, primary section 418 is the portion of index partition 402 located near first position 410 (e.g., $LP_3$) and is the section of index partition 402 where old/outdated metadata indexes (e.g., Index 1, Index 2, and Index 3 not shown) were previously written and overwritten. Index management program 101 instructs tape supply cartridge and take-up reel to move and reposition tape 400 until tape head 406 is positioned over primary section 418. Index management program 101 can instruct tape head 406 to overwrite outdated Index 3 (not shown) with updated metadata index 420 (i.e., Index 4). Metadata index 420 includes updated metadata regarding all data stored in data partition 404, including recently added File C (e.g., Index 1, File A, Index 2, File B, Index 3, and File C). Outdated Index 3 (now overwritten with metadata index 420 in index partition 402) only included metadata regarding files and data stored in data partition 404, for example Index 1, File A, Index 2, File B, and Index 3.

Continuing the above example, after index management program 101 has completed writing metadata index 420, index management program 101 repositions tape 400 to second position 412 of data partition 404 and instructs tape head 406 to write data index 422 (e.g., Index 4). In most embodiments, second position 412 is the portion of data partition 404 immediately appending the most recently updated file (e.g., File C). As previously discussed, LTO tape technology and LTFS formatted tape, write data to tape using a serpentine recording method. As a result, the most recently updated file on data partition 404 may be located at any writeable location in data partition 404. Put simply, the location of second position 412 is defined by the location of the most recently added file and could be located at any position on tape 400 (i.e., near first position 410, EOT, or anywhere between middle). In some embodiments, data index 422 is identical to metadata index 420 where the indexes include the same metadata. In other embodiments, metadata index 420 contains at least the same metadata as data index 422, but can also include additional data or metadata.

Continuing the above example, index management program 101 can instruct and control the movement of tape 400 to reposition tape 400 in the tape drive to expose the EOT. In some embodiments, index management program 101 begins winding tape 400 on the take-up reel of the tape drive while simultaneously unwinding the tape from tape supply cartridge. Index management program 101 continues this winding and unwinding, respectively, until approximately the complete length of tape 400 is wound on take-up reel in the tape drive. Index management program 101 can then begin an "unthread" operation by rewinding tape 400 at low tension from the take-up reel on to the tape supply cartridge. Index management program 101 can continue the "unthread" operation until tape 400 is unthreaded from the tape drive. After the "unthread" operation is complete, index management program 101 can complete the "unmount" operation and the tape can be archived with a reduced risk of stretching.

In embodiments where index management program 101 determines that the first distance 414 is not less than (i.e., is greater than) second distance 416 (specific example not shown), index management program 101 first writes the data index in the data partition 404 to append the most recently added data file. After the data index is written index management program 101 then repositions tape 400 and writes a metadata index in primary section 418 in the index partition 402 near $LP_3$.

As such, when first distance 414 is less than second distance 416, index management program 101 repositions tape 400 from its initial position (i.e., the position resulting from the operation prior to initiating the "unmount" operation) to first position 410 (i.e., $LP_3$) near the BOT to second position 412 (i.e., somewhere between $LP_3$ and $LP_4$) and then to EOT at high tension. Once tape 400 has been repositioned to the EOT the "unthread" operation can begin at low tension. This results in tape 400 making one lengthwise pass at high tension and one lengthwise pass at low tension during the "unthread" operation.

As stated in reference to FIG. 3, traditional methods of unmounting tapes from tape drives for archival purposes can cause a significant time delay in tapes having more than one indexed partition. Using the conventional method discussed in FIG. 3 (i.e., where the data index is always written prior to the metadata index) even if the tape head 406 was positioned near first position 410 (e.g., near BOT or $LP_3$), tape head 406 would be required to always first write the data index appending the most recently written data file. In some instances, this data file could be located close to $LP_4$ near EOT. In this example, even though the tape is initially positioned near the BOT, the tape would make a lengthwise pass from BOT to EOT (i.e., near $LP_4$) to write the data index, then another lengthwise pass back to BOT (i.e., near $LP_3$) to write the metadata index, before again having to make an additional lengthwise pass to EOT in preparation of the "unthread" operation. Using the same scenario where tape head 406 is located near BOT (i.e., near $LP_3$) and the most recently written data file is written near EOT (i.e., near $LP_4$), various embodiments of index management program 101 would consider whether first distance 414 is less than second distance 416. Since, in this example, the tape head 406 is located near the first position 410, and second position 412 (i.e., the area after the most recently added data file) is near EOT (i.e., $LP_4$), index management program 101 would first write the metadata index and then make almost a complete lengthwise pass to second position 412, and then continue the remaining tape length to the EOT in preparation for the "unthread" operation. As a result, while conventional methods could require multiple lengthwise passes to complete tape indexing, embodiments of the present invention reduce the number of these passes and the time delays incurred by such passes.

Figure 5:
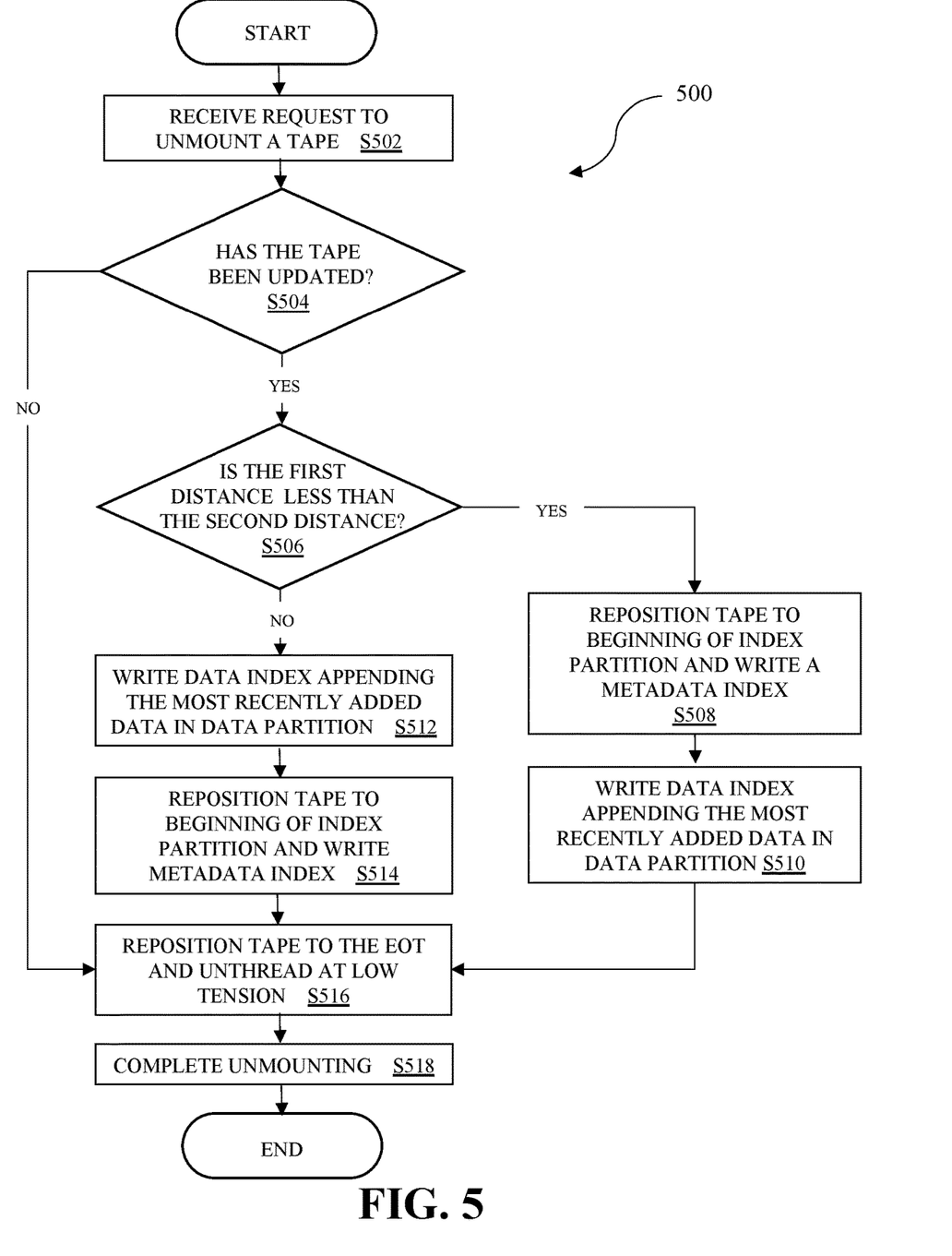
FIG. 5 is a flow chart diagram depicting operational steps by index management program 101, generally designated 500, for indexing partitioned tape during an "unmount" operation in accordance with at least one embodiment of the present invention.

FIG. 5 is a flow chart diagram depicting operational method steps by index management program 101, generally designated 500, in accordance with at least one embodiment of the present invention. Method 500, performed by index management program 101, allows for a tape, having at least an index partition and a data partition (e.g., LTFS formatted tape), to be correctly indexed during an "unmount" operation. As discussed herein, index management program 101 can combine "unthread" operations while also considering options to reduce movement of the tape during "unmount" operations. FIG. 5 provides an exemplary embodiment and does not imply any limitation with regard to the environments in which different embodiments may be implemented. Many modifications to the depicted environment may be made by those skilled in the art without departing from the scope of the invention as recited by the claims.

In some embodiments, method 500 begins at operational step S502, where index management program 101 receives a request to "unmount" the tape from a tape drive. Method 500 proceeds to decision step S504, where index management program 101 determines if the tape has been updated. As discussed generally herein, a tape is considered updated if any of the tape contents (e.g., metadata and/or file data) of either the index partition or the data partition have been altered or modified since the tape was previously indexed.

If, at decision step S504, index management program 101 determines that the tape has not been updated (decision step "NO" branch), method 500 proceeds to operational step S516, where the tape is repositioned to the EOT and an "unthread" operation is performed at low tension.

If, at decision step S504, index management program 101 determines that the tape has not been updated (decision step "YES" branch), method 500 proceeds to decision step S506. At decision step S506, index management program 101 determines if the first distance is less than the second distance. Index management program 101 can identify first distance 414, by calculating the tape length between first position 410 and the position of tape head 406 and second distance 416, by calculating the length of tape between first position 410 and second position 412. Index management program 101 can then compare first distance 414 and second distance 416 to determine which is smaller/shorter.

If, at decision step S506, index management program 101 determines that the first distance is less than the second distance (decision step "YES" branch), method 500 proceeds to operational step S508. At step S508, index management program 101 repositions the tape near the BOT to the earliest recording position of the index partition and writes a metadata index in the index partition. Method 500 proceeds to operational step S510. At step S510, index management program 101 repositions the tape to the most recently added data/object in the data partition and writes a data index appending the most recently added data object/file.

If, at decision step S506, index management program 101 determines that the first distance is not less than the second distance i.e., first distance is greater than second distance (decision step "NO" branch), method 500 proceeds to operational step S512. At step S512, index management program 101 repositions the tape to the most recently added data object/file in the data partition and writes a data index appending the most recently added data object/file. Method 500 proceeds to operational step S514. At step S514, index management program 101 repositions the tape near the BOT to the earliest recording position of the index partition and writes a metadata index in the index partition.

Method 500 proceeds to operational step S516. At step S516, index management program 101 repositions the tape to the EOT performs an "unthread" operation at low tension. Method 500 proceeds to operational step S518, where index management program 101 completes the "unmount" operation and the method 500 ends.

Figure 6:
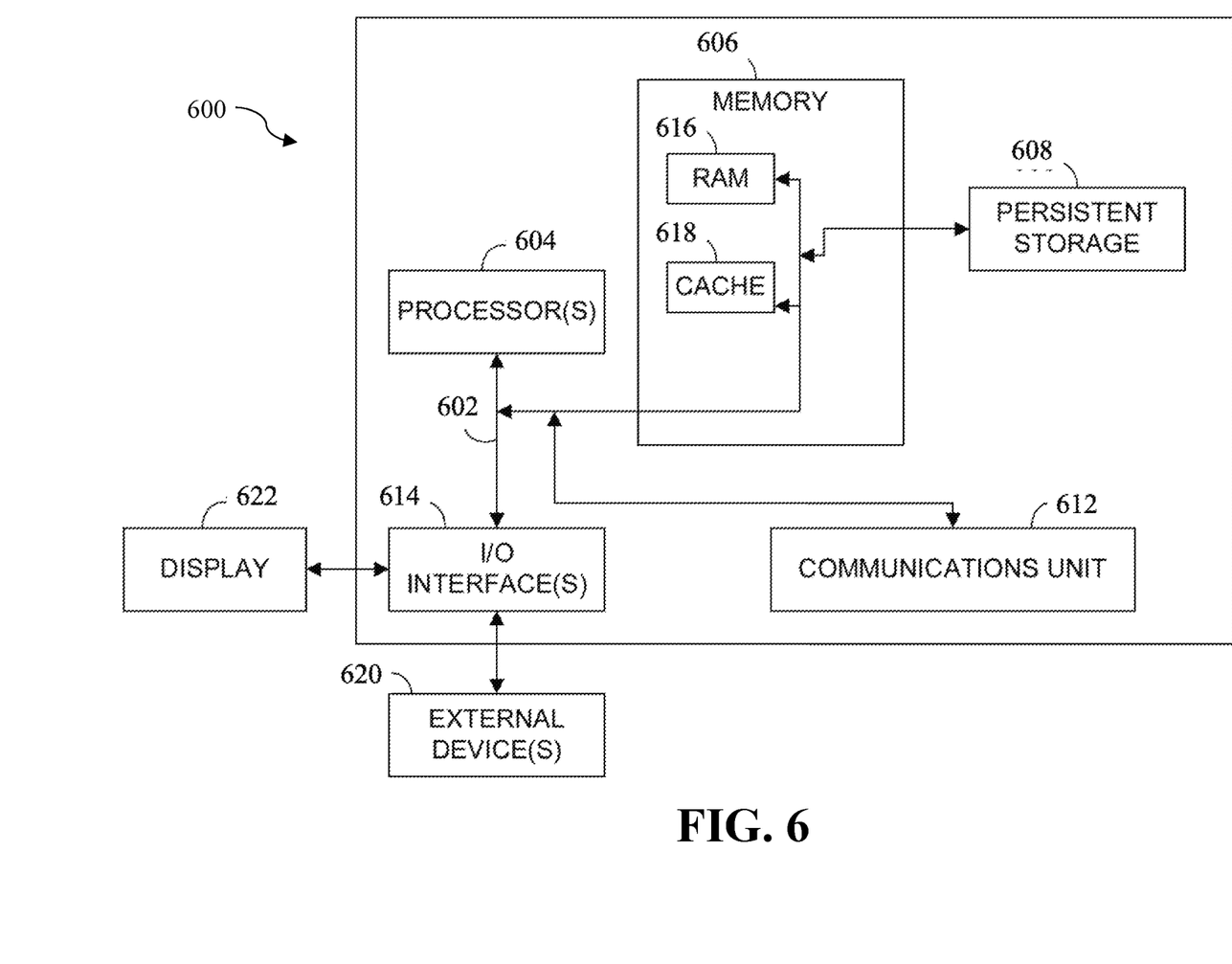
FIG. 6 is a block diagram depicting components of a computer, generally designated 600, suitable for executing index management program 101 in accordance with at least one embodiment of the present invention.

FIG. 6 is a block diagram depicting components of a computing device, generally designated 600, suitable for executing index management program 101, host device 102, tape library 104, client device 106, user interface 112 and/or any computing devices generally depicted in FIG. 1 in accordance with at least one embodiment of the present invention. Computing device 600 includes one or more processor(s) 604 (including one or more computer processors), communications fabric 602, memory 606 including, RAM 616 and cache 618, persistent storage 608, communications unit 612, I/O interface(s) 614, display 622, and external device(s) 620. It should be appreciated that FIG. 6 provides only an illustration of one embodiment and does not imply any limitations with regard to the environments in which different embodiments may be implemented. Many modifications to the depicted environment may be made.

As depicted, computing device 600 operates over communications fabric 602, which provides communications between computer processor(s) 604, memory 606, persistent storage 608, communications unit 612, and input/output (I/O) interface(s) 614. Communications fabric 602 can be implemented with any architecture suitable for passing data or control information between processor(s) 604 (e.g., microprocessors, communications processors, and network processors), memory 606, external device(s) 620, and any other hardware components within a system. For example, communications fabric 602 can be implemented with one or more buses.

Memory 606 and persistent storage 608 are computer readable storage media. In the depicted embodiment, memory 606 includes random-access memory (RAM) 616 and cache 618. In general, memory 606 can include any suitable volatile or non-volatile one or more computer readable storage media.

Program instructions for index management program 101 can be stored in persistent storage 608, or more generally, any computer readable storage media, for execution by one or more of the respective computer processor(s) 604 via one or more memories of memory 606. Persistent storage 608 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 can include one or more network interface cards. Communications unit 612 may provide communications through the use of either or both physical and wireless communications links. In the context of some embodiments of the present invention, the source of the various input data may be physically remote to computing device 600 such that the input data may be received, and the output similarly transmitted via communications unit 612.

I/O interface(s) 614 allows for input and output of data with other devices that may operate in conjunction with computing device 600. For example, I/O interface(s) 614 may provide a connection to external device(s) 620, which may be as a keyboard, keypad, a touch screen, or other suitable input devices. External device(s) 620 can also include portable computer readable storage media, for example thumb drives, portable optical or magnetic disks, and memory cards. Software and data used to practice embodiments of the present invention can be stored on such portable computer readable storage media and may be loaded onto persistent storage 608 via I/O interface(s) 614. I/O interface(s) 614 also can similarly connect to display 622. Display 622 provides a mechanism to display data to a user and may be, for example, a computer monitor.

What is claimed is:

1. A computer-implemented method for unmounting a tape from a tape drive, comprising:
    receiving a request to unmount the tape from the tape drive;
    determining that at least one update has been made to the tape since the tape has been mounted to the tape drive; and
    responsive to the determination:
        identifying a tape head position with respect to the tape, wherein the tape includes a data partition and an index partition;
        identifying a first position and a second position on the tape;
        determining a first distance, wherein the first distance is a length of tape between the first position and the tape head position;
        determining a second distance, wherein the second distance is a length of tape between the first position and the second position;
        determining the first distance is less than the second distance; and
        responsive to determining that the first distance is less than the second distance:
            repositioning the tape to a primary section of the index partition;
            writing a metadata index in the index partition;
            repositioning the tape to the second position of the data partition; and
            writing a data index beginning at the second position of the data partition.

2. The computer-implemented method of claim 1, wherein the first position is a longitudinal position at the earliest portion of the tape where a data file can be written.

3. The computer-implemented method of claim 1, wherein the second position is a longitudinal position located at the end of a data file most recently written to the data partition.

4. The computer-implemented method of claim 1, wherein writing the metadata index further comprises:
    overwriting an outdated metadata index with the metadata index, wherein the metadata index includes data associated with the at least one update.

5. The computer-implemented method of claim 1, wherein the primary section is a section of the index partition beginning at the first position.

6. The computer-implemented method of claim 1, wherein the method further comprises:
    repositioning the tape to an end of tape position;
    winding the tape at a tension below a predetermined amount of tension; and
    unthreading the tape from the tape drive.

7. The computer-implemented method of claim 1, wherein the method further comprises, responsive to writing the metadata index in the index partition:
    repositioning the tape to an end of tape position;
    winding the tape at a tension above a predetermined amount of tension; and
    unthreading the tape from the tape drive.

8. A computer-implemented method for unmounting a tape from a tape drive, comprising:
- receiving a request to unmount the tape from the tape drive;
- determining that at least one update has been made to the tape since the tape has been mounted to the tape drive; and
- responsive to the determination:
  - identifying a tape head position with respect to the tape, wherein the tape includes a data partition and an index partition;
  - identifying a first position and a second position on the tape;
  - determining a first distance, wherein the first distance is a length of tape between the first position and the tape head position;
  - determining a second distance, wherein the second distance is a length of tape between the first position and the second position;
  - determining the first distance is greater than the second distance; and
  - responsive to determining that the first distance is less than the second distance:
    - repositioning the tape to the second position of the data partition;
    - writing a data index beginning at the second partition of the data partition;
    - repositioning the tape to the primary section of the index partition; and
    - writing a metadata index in the index partition.

9. The computer-implemented method of claim 8, wherein the first position is a longitudinal position at the earliest portion of the tape where a data file can be written.

10. The computer-implemented method of claim 8, wherein the second position is a longitudinal position located at the end of a data file most recently written to the data partition.

11. The computer-implemented method of claim 8, wherein writing the metadata index further comprises:
- overwriting an outdated metadata index with the metadata index, wherein the metadata index includes data associated with the at least one update.

12. The computer-implemented method of claim 8, wherein the primary section is a section of the index partition near first position and is the section where the metadata index is written.

13. The computer-implemented method of claim 8, wherein the method further comprises, responsive to writing the metadata index in the index partition:
- repositioning the tape to an end of tape position;
- winding the tape at a tension below a predetermined amount of tension; and
- unthreading the tape from the tape drive.

14. The computer-implemented method of claim 8, wherein the method further comprises:
- repositioning the tape to an end of tape position;
- winding the tape at a tension above a predetermined amount of tension; and
- unthreading the tape from the tape drive.

15. A computer system for unmounting a tape from a tape drive, the computer system comprising:
- one or more computer processors;
- one or more computer readable storage media;
- computer program instructions;
- the computer program instructions being stored on the one or more computer readable storage media for execution by the one or more computer processors; and
- the computer program instructions including instructions to:
  - receive a request to unmount the tape from the tape drive;
  - determine that at least one update has been made to the tape since the tape has been mounted to the tape drive; and
  - responsive to the determination:
    - identify a tape head position with respect to the tape, wherein the tape includes a data partition and an index partition;
    - identify a first position and a second position on the tape;
    - determine a first distance, wherein the first distance is a length of tape between the first position and the tape head position;
    - determine a second distance, wherein the second distance is a length of tape between the first position and the second position;
    - determine the first distance is less than the second distance; and
    - responsive to determining that the first distance is less than the second distance:
      - reposition the tape to a primary section of the index partition;
      - write a metadata index in the index partition;
      - reposition the tape to the second position of the data partition; and
      - write a data index beginning at the second position of the data partition.

16. The computer system of claim 15, wherein the first position is a longitudinal position at the earliest portion of the tape where a data file can be written.

17. The computer system of claim 15, wherein the second position is a longitudinal position located at the end of a data file most recently written to the data partition.

18. The computer system of claim 15, wherein the program instructions to write the metadata index further comprises instructions to:
- overwrite an outdated metadata index with the metadata index, wherein the metadata index includes data associated with the at least one update.

19. The computer system of claim 15, wherein the primary section is a section of the index partition near first position and is the section where the metadata index is written.

20. The computer system of claim 15, wherein the program instructions further comprises, responsive to writing the data index beginning at the second position of the data partition, instructions to:
- reposition the tape to an end of tape position;
- wind the tape at a tension below a predetermined amount of tension; and
- unthread the tape from the tape drive.

* * * * *